United States Patent
Zhou et al.

(10) Patent No.: US 9,909,684 B2
(45) Date of Patent: Mar. 6, 2018

(54) LEVER TYPE SWITCH VALVE

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Huasong Zhou, Fujian (CN); Jun Han, Fujian (CN); Yuzhi Wu, Fujian (CN); Lihong Hu, Fujian (CN); Bin Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 112 days.

(21) Appl. No.: 14/889,865

(22) PCT Filed: Apr. 4, 2014

(86) PCT No.: PCT/CN2014/074791
§ 371 (c)(1),
(2) Date: Nov. 9, 2015

(87) PCT Pub. No.: WO2014/187199
PCT Pub. Date: Nov. 27, 2014

(65) Prior Publication Data
US 2016/0123495 A1   May 5, 2016

(30) Foreign Application Priority Data

May 24, 2013   (CN) .......................... 2013 1 0200263
May 24, 2013   (CN) ..................... 2013 2 0291861 U
Dec. 24, 2013   (CN) ..................... 2013 2 0860755 U

(51) Int. Cl.
*F16K 11/07*   (2006.01)
*F16K 31/60*   (2006.01)
*F16K 11/044*   (2006.01)

(52) U.S. Cl.
CPC .......... *F16K 31/602* (2013.01); *F16K 11/044* (2013.01); *F16K 11/07* (2013.01); *F16K 11/0712* (2013.01)

(58) Field of Classification Search
CPC .. F16K 11/044; F16K 11/0712; F16K 31/602; Y10T 137/86686; B67D 1/0082
(Continued)

(56) References Cited

U.S. PATENT DOCUMENTS 1,921,092 A * 8/1933 Newton .............. F15B 13/0405
137/625.27
2,496,036 A * 1/1950 Christensen ............ F15B 13/04
137/625.25
(Continued)

FOREIGN PATENT DOCUMENTS

CN   2216611 Y   1/1996
CN   2871848 Y   2/2007
(Continued)

*Primary Examiner* — Reinaldo Sanchez-Medina
(74) *Attorney, Agent, or Firm* — Rabin & Berdo, P.C.

(57) ABSTRACT

A lever type switch valve has a switch chamber with three sections in the axial direction including, two outlet cavities at two ends and an inlet cavity in the central section. The outer end of each outlet cavity in the axial direction has a slide section; an inner protruding ring is disposed between two ends of the inlet cavity and the outlet cavities; a spindle of dumbbell shape, the spindle is slidably coupled to the inner side of the switch chamber axially; the spindle has three sections in the axial direction that are two pistons at two ends and a flowing section in the central section; the piston has a big outer end and a small inner end. The outer ends of the pistons are slidably coupled to the slide section in sealing way, the axial length of the outlet cavity is larger than the axial direction of the piston.

14 Claims, 9 Drawing Sheets

(58) Field of Classification Search
USPC .... 137/596, 625.25, 625.26, 625.48, 625.49,
137/625.67, 625.68, 883
See application file for complete search history.

(56) References Cited

U.S. PATENT DOCUMENTS

| | | | | |
|---|---|---|---|---|
| 2,638,122 A | * | 5/1953 | Ludwig | F16K 11/07 137/625.48 |
| 2,997,065 A | * | 8/1961 | Johnson | F16K 11/0712 137/625.69 |
| 3,195,574 A | * | 7/1965 | Carls | F15B 13/04 137/625.69 |
| 3,913,620 A | * | 10/1975 | Pauliukonis | F16K 31/363 137/625.27 |
| 4,026,325 A | * | 5/1977 | Loveless | F16K 11/044 137/625.26 |
| 4,641,686 A | * | 2/1987 | Thompson | F16K 11/044 137/625.65 |
| 4,726,493 A | * | 2/1988 | Wallace | B67D 1/0082 137/625.27 |
| 4,840,198 A | | 6/1989 | Ott | |
| 5,518,030 A | | 5/1996 | Liu et al. | |

FOREIGN PATENT DOCUMENTS

| | | |
|---|---|---|
| CN | 201198907 Y | 2/2009 |
| CN | 201302002 Y | 9/2009 |
| CN | 203322374 U | 12/2013 |
| WO | WO 2009-058988 A3 | 5/2009 |

* cited by examiner

LEVER TYPE SWITCH VALVE

FIELD OF THE INVENTION

The present invention relates to a switch valve, especially to a switch valve operating based on lever principle.

BACKGROUND OF THE INVENTION

Existing axial pulling type switch valve is usually disposed with a pulling top as an operation portion to control the switch of the waterway. The inlet waterway is switched to connect to the outlet waterway by controlling the switch of inlet waterway and two waterways. Existing axial pulling type switch valve has some obvious defects: firstly, as the water flowing and the air pressure effect on the switch movable component, when switched, it needs large switch force; secondly, as the movable component needs to slide to connect to the waterway, it has long switch route; based on above two reasons, existing axial pulling type switch valve is inconvenient to use, it doesn't operate smooth.

SUMMARY OF THE INVENTION

To solve the problems of existing switch valve that it is inconvenient to use and doesn't operate smooth due to large switch force needed and the long route, the present invention is provided with a lever type switch valve, the design concept is that: pressing the lever device can drive the spindle assembled in the switch chamber to move up and down, then the piston on the spindle turns on or turns off the waterway, so as to switch the waterway. The technical proposal of the present invention is that:

A lever type switch valve, wherein comprising:

a switch chamber with three sections in the axial direction that are two outlet cavities at two ends and an inlet cavity in the central section; the outer end of each outlet cavity in the axial direction is disposed with a slide section; an inner protruding ring is respectively disposed between two ends of the inlet cavity and the outlet cavities;

a spindle of dumbbell shape, the spindle is slidably coupled to the inner side of the switch chamber axially; the spindle has three sections in the axial direction that are two pistons at two ends and a flowing section in the central section; the piston has a big outer end and a small inner end;

therein, the outer ends of the pistons are slidably coupled to the slide section in sealing way, the axial length of the outlet cavity is larger than the axial direction of the piston; the axial length of the flowing section is larger than the axial length of the inlet cavity, the flowing section passes through the inner protruding ring and having a flowing passage with the inner protruding ring;

the inlet cavity is connected to an inlet; the outlet cavities are respectively connected to an outlet, one end of the spindle is movably coupled to one end of a lever by a movable element;

when the inner end of the piston of one outlet cavity couples to the inner protruding ring at the corresponding side in sealing way, the waterway of the outlet cavity and the inlet cavity is closed; at the same time, the outlet cavity of the other side is connected to the inlet cavity by the waterway of the flowing section and the inner protruding ring.

In another preferred embodiment, a slide section of the outlet cavity keeps in sealing state with the corresponding piston; the spindle is disposed with a through hole in the axial direction, the through hole connects the two slide sections.

In another preferred embodiment, the flowing section is a connecting rod, the diameter of the connecting rod is smaller than the inner diameter of the inner protruding ring, it can be a solid body with various water grooves;

In another preferred embodiment, the inner end and the outer end of the piston is respectively disposed with a groove, which is embedded with a sealing ring; the sealing ring of the outer end is slidably coupled to the inner wall of the slide section in sealing way; the sealing ring of the inner end is coupled to the inner protruding ring in sealing way.

In another preferred embodiment, the lever is disposed with a gear block; a pin with a reset spring is further configured that the pin movably couples to the gear block when the lever moves up and down.

In another preferred embodiment, the switch chamber is disposed in a columnar valve body; the outer wall of the valve body is axially disposed with three water holes that are respectively corresponding to the inlet and the two outlets; a housing is further configured that the housing is axially disposed with three cavities and a columnar blind hole running through the three cavities; each cavity is disposed with an extension waterway; the valve body is coupled to the inner side of the blind hole, each cavity is connected to a water hole to form an integrated waterway.

In another preferred embodiment, the outer wall of the valve body is disposed with a sealing ring, the cavities are separated from each other by the sealing ring in sealing way.

A second technical proposal of the present invention is that;

A lever type switch valve, wherein comprising:

a valve body with an inlet, two outlets and a switch chamber; the chamber is disposed with three sections in the axial direction that are two outlet cavities at two ends and an inlet cavity in the central section; the inlet is connected to the inlet cavity, two outlets are respectively connected to the two outlet cavities; the outer end of each outlet cavity in the axial direction is disposed with a slide section; the inlet cavity is disposed with two sealing sections respectively located above and below the inlet;

a spindle, the spindle is slidably assembled in the switch chamber axially; the spindle has a spindle body, two first sealing plugs respectively slidably coupled to the two slide sections in sealing way and a second sealing plug that can switch to couple to the two sealing sections in sealing way, three sealing plugs are spaced disposed in the axial direction in the spindle body and the second sealing plug is located between the two first sealing plug; when the second sealing plug is coupled to one sealing section in sealing way, the inlet is connected to the outlet of the other side of the sealing section.

In another preferred embodiment, the sealing section has a first straight section, a transition incline section and a second straight section that are connected in sequence, the diameter of the second straight section is larger than the diameter of the first straight section and the second straight section is near to the inlet; the second sealing plug is a piston, the second sealing plug can be coupled to the transition incline section and the second straight section in sealing way.

In another preferred embodiment, the slide section is straight column shaped. In another preferred embodiment, a first guiding incline surface is respectively disposed at the connecting position of the inner end of the outlet and the slide section, a second guiding incline surface is respectively disposed at the connecting position of the inner end of the outlet and the first straight section. In another preferred embodiment, the spindle body is disposed with a through hole extended axially, the through hole is connected to the bottom portion of the switch chamber.

In another preferred embodiment, the first sealing plug is disposed with a first protruding ring and a first sealing ring, the first protruding ring is fixedly connected to the spindle body and an annular first groove is concaved at the outer periphery of the first protruding ring, the first sealing ring is locked to the first groove, the first sealing ring is slidably coupled to the slide section in sealing way; the second sealing plug is disposed with a second protruding ring and a second sealing ring, the second protruding ring is fixedly connected to the spindle body and an annular second groove is concaved at the outer periphery of the second protruding ring, the second sealing ring is locked to the second groove, the second sealing ring is coupled to the sealing section in sealing way.

In another preferred embodiment, the top portion of the valve body is disposed with a cover plate, the switch valve is further disposed with a lever button with gears, a position pin fixed to the cover plate and coupled to the gears and a reset elastic element, the lever button is disposed with a movable portion, the top end of the spindle body is movably coupled to the movable portion to drive the spindle to slide axially, the reset elastic element abuts between the cover plate and the position pin.

In another preferred embodiment, a housing is further disposed, the housing is disposed with an assembly cavity, an inlet passage and two outlet passages, the inlet passage is located between two outlet passages, the valve body is assembled in the assembly cavity, the inlet is connected to the inlet passage, two outlets are respectively connected to the two outlet passages.

In another preferred embodiment, a sealing ring is further disposed, the sealing ring abuts between the outer wall of the valve body and the cavity wall of the assembly cavity.

In another preferred embodiment, the second protruding ring of the second sealing ring has the upper end face inclined upwardly and the lower end face inclined downwardly, the periphery wall of the second protruding ring is straight tubular; the second sealing plug can couple to the transition incline section and the second straight section of the sealing section in sealing way. The technical proposal of the present invention has advantages:

1. the piston removes the water resistance of the spindle, and at the same time, it gets a motive force in the same direction, thus making the switch force saving and the switch forces at the upper waterway and the lower waterway balanced.

2. as the pistons have a large outer end and a small inner end, when the pistons moves in the axial direction, the section area of the flowing variation changes large, it thus decreases the variation volume in the same route of the spindle, so that it meets the need of large outlet volume, that is to say, it meets the outlet volume need and saves the route of the spindle.

3. The spindle is disposed with the through hole, thus avoiding the effect of the air pressure due to cavity variation, it improves the resistance of the spindle, making it force saving and convenient. at the same time, the through hole is an obligate exhaust hole, if it needs to exhaust the air at the bottom portion of the switch chamber, it only needs to dispose a throughout hole in the spindle body to connect to the through hole to exhaust the air, thus making it with well suitability.

4. another technical proposal of the present invention has the working principle that:

In the initial state, if the second sealing plug of the spindle is coupled to the sealing section above the inlet in sealing way to disconnect the above outlet and the inlet, the outlet below the inlet is connected to the inlet, the outlet outflows water;

the spindle slides downwardly to make the second sealing plug of the spindle coupled to the sealing section below the inlet in sealing way to connect the outlet below and the inlet, the outlet above the inlet is connected to the inlet, the outlet outflows water.

As the second sealing plug (a piston) is switched to close the two sealing sections, it has short route and it meets the large outlet volume need, the spindle can remove the water resistance of the spindle, at the same time, it gets a motive force in the same direction, thus making the switch force saving and the switch forces at the upper waterway and the lower waterway balanced, it also assists to the sealing effect of the sealing section.

5. the sealing section has a first straight section, a transition incline section and a second straight section connected in sequence, it has better sealing performance.

6. the slide section is straight column shaped, so that it is force saving at the beginning of moving and during the sliding.

7. the connecting portion of the inner end of the outlet and the slide section is disposed with a first guiding incline surface, the connecting portion of the inner end of the outlet and the first straight section is disposed with a second guiding incline surface, so that the sealing rings are protected during assembling, thus avoiding damage to the sealing ring by the sharp portion of the outlet during assembly resulting in being unable to seal

BRIEF DESCRIPTION OF THE DRAWINGS

The present invention will be further described with the drawings and the embodiments.

DETAILED DESCRIPTION OF THE EMBODIMENTS

Figure 1:
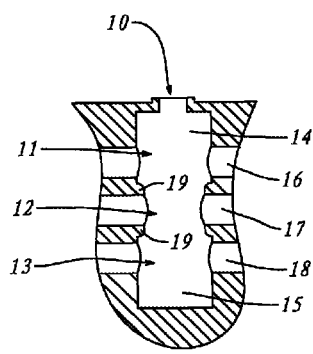
FIG. 1 illustrates a sectional diagram of a part of the switch chamber of a first embodiment of the present invention.
Figure 2:
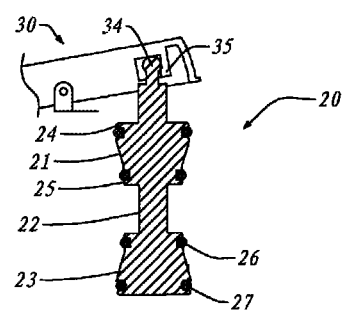
FIG. 2 illustrates a sectional diagram of a part of the spindle of the first embodiment of the present invention.
Figure 3:
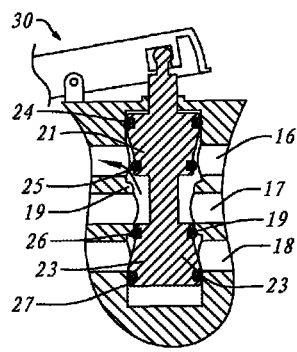
FIG. 3 illustrates a sectional diagram of the assembly of the first embodiment of the present invention.

The first embodiment, as figured in FIGS. 1~3, FIG. 1 illustrates the structure of the switch chamber 10, FIG. 2 illustrates the structure of the spindle 20, FIG. 3 illustrates the assembly of the device.

Figure 10:
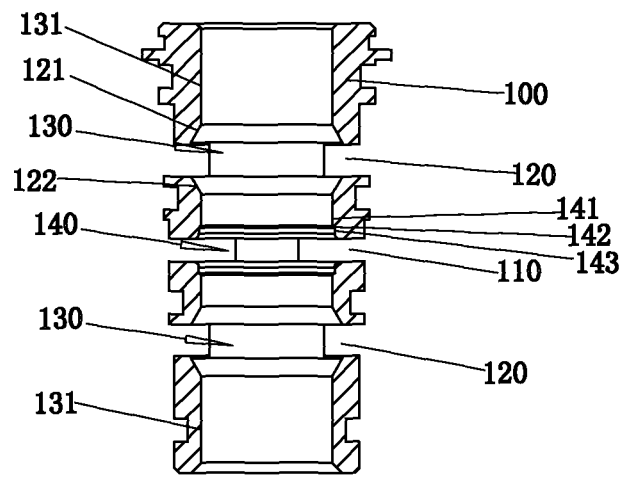
FIG. 10 illustrates a sectional diagram of the valve body of the third embodiment of the present invention.
Figure 11:
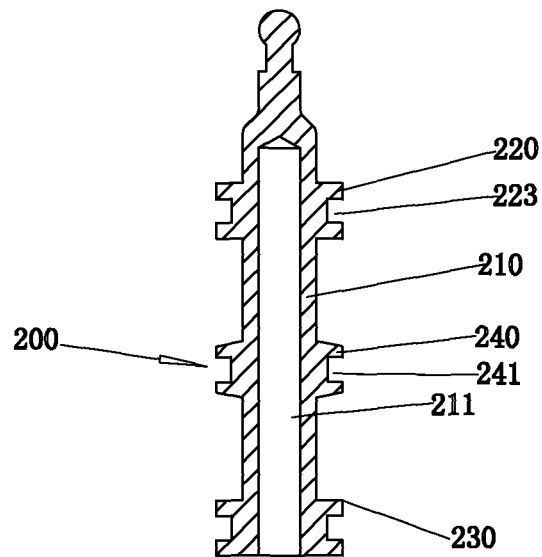
FIG. 11 illustrates a sectional diagram of the spindle of the third embodiment of the present invention.

As figured in FIG. 10 the switch chamber 10 is divided into three sections in the axial direction that are the outlet cavities 11, 13 at two ends and the inlet cavity 12 in the central section; the outlet cavities 11, 13 respectively has a slide section 14, 15 at the axial outer end; an inner protruding ring 19 is respectively disposed between two ends of the inlet cavity 12 and the outlet cavities 11, 13; the inlet cavity 12 is connected to an inlet 17; the outlet cavities 11, 13 are respectively connected to an outlet 16, 18.

As figured in FIG. 2, the spindle 20 is dumbbell shaped, it has three sections as well in the axial direction that are two pistons 21, 23 at two ends and a flowing section 22 in the central section; the pistons 21, 23 respectively have a large outer end and a small inner end, taking piston 21 for example, the outer diameter of the outer end 24 is larger than the outer diameter of the inner end 25, the piston 21 is an inverted truncated cone shaped. One end of the spindle 20 is movably coupled to a movable portion 35 at one end of a lever 30 by a movable element 34, when the lever 30 moves up and down like a seesaw, it drives the spindle 20 to move up and down in the axial direction. Referring to FIG. 3 combining FIG. 1 and FIG. 2, it illustrates the assembly of the spindle 20 coupled in the switch chamber 10. taking above mentioned piston 21 of the spindle 20 for example, the outer end 24 of the piston 21 is slidably coupled to the slide section 14 in sealing way; the axial length of the outlet cavity 11 is larger than the axial length of the piston 21; the axial length of the flowing section 22 is larger than the axial length of the inlet cavity 12, the flowing section 22 runs through the inner protruding ring 19 and forming a flowing passage with the inner protruding ring 19; with this structure, the spindle is integratedly slidably coupled to the switch chamber 10 in the axial direction;

When one piston 23 in the outlet cavity 13 has the inner end coupled to the corresponding inner protruding ring 19 in sealing way, the waterway of the outlet cavity 13 and the inlet cavity 12 is closed, at the same time, the outlet cavity of the other side 11 is connected to the inlet cavity 12 by the waterway of the flowing section 22 and the inner protruding ring 19, the waterway is figured by the arrow. In this state, the spindle 20 is lifted up by the lever 30, the waterway is figured by the arrow, if pressing the lever of FIG. 3 on this basis in clockwise direction, the inlet cavity 12 will be connected to the lower outlet cavity 13, at the same time, the outlet cavity 11 is disconnected from the inlet cavity 12, so is the switch function of the valve.

As figured in FIG. 3, as the pistons 21, 23 have a large outer end and a small inner end, in the waterway of the flowing section 22 and the inner protruding ring 19, the water flowing acts a pushing force to the pistons 21, 23, so is the forming of the waterway, in whether side of the piston 21 or piston 23, with this effect, it removes the water resistance when the spindle 20 moves up and down, and at the same time, it gets a motive force in the same direction, thus making the switch force saving and the switch forces at the upper waterway and the lower waterway balanced. On the other hand, as the piston 21, 23 have a large outer end and a small inner end, when the pistons 21, 23 moves in the axial direction, the section area of the flowing variation changes large, it thus decreases the variation volume in the same route of the spindle 20, so that it meets the need of large outlet volume, that is to say, it meets the outlet volume need and saves the route of the spindle 20.

As can be seen from above, this embodiment accomplish a lever type switch function that is switch force saving, switch force balanced and the spindle 20 route shortened.

This embodiment has other features:

The flowing section 22 is a connecting rod, the diameter of the connecting rod is smaller than the inner diameter of the inner protruding ring 19 as the flowing section 22 is fixedly connected to the two pistons 21, 23, moreover, it has to ensure of forming the waterway of the inlet cavity 12 and the outlet cavities 11, 13, so that the flowing section 22 can have various shapes. The connecting rod is the simplest shape and the most material saving.

The outer end 24, 27 and the inner end 25, 26 of the piston 21, 23 are disposed with a groove, in which a sealing ring is embedded; the sealing rings of the outer end 24, 27 are slidably coupled to the inner wall of the slide sections 14, 15 in sealing way; the sealing rings of the inner end 26, 25 are coupled to the inner protruding ring 19 in sealing way, with this shape, the spindle 20 can made of various materials that have different strength and resistance to corrosion performance to apply to different fluid, they can achieve well sealing.

Figure 4:
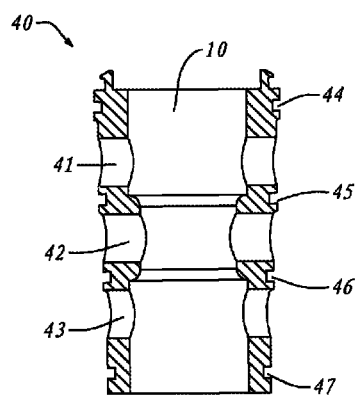
FIG. 4 illustrates a sectional diagram of the switch chamber disposed in a valve body of a second embodiment of the present invention.
Figure 5:
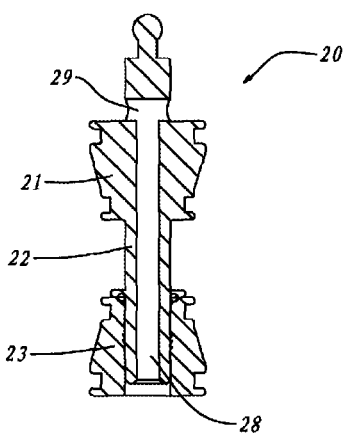
FIG. 5 illustrates a sectional diagram of a part of the spindle of the second embodiment of the present invention.
Figure 6:
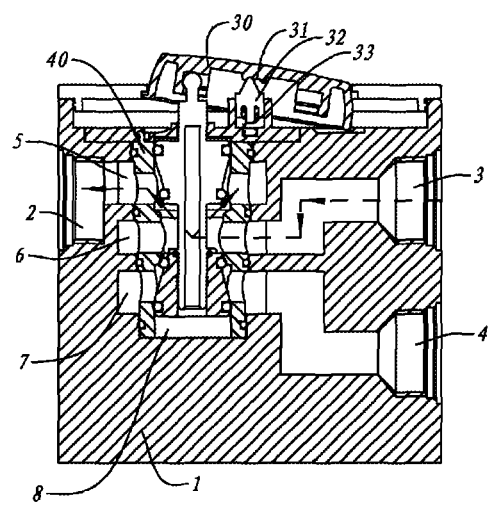
FIG. 6 illustrates a sectional diagram of the assembly of the second embodiment of the present invention.
Figure 7:
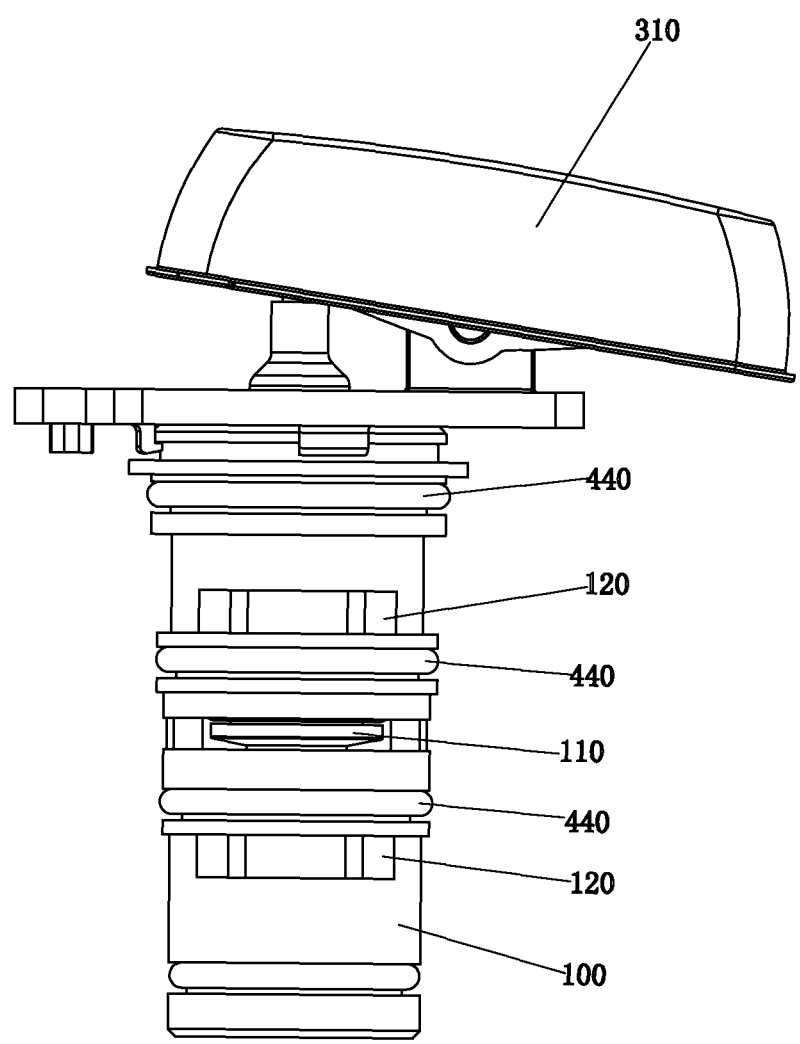
FIG. 7 illustrates a schematic diagram of the assembly of a third embodiment of the present invention.
Figure 8:
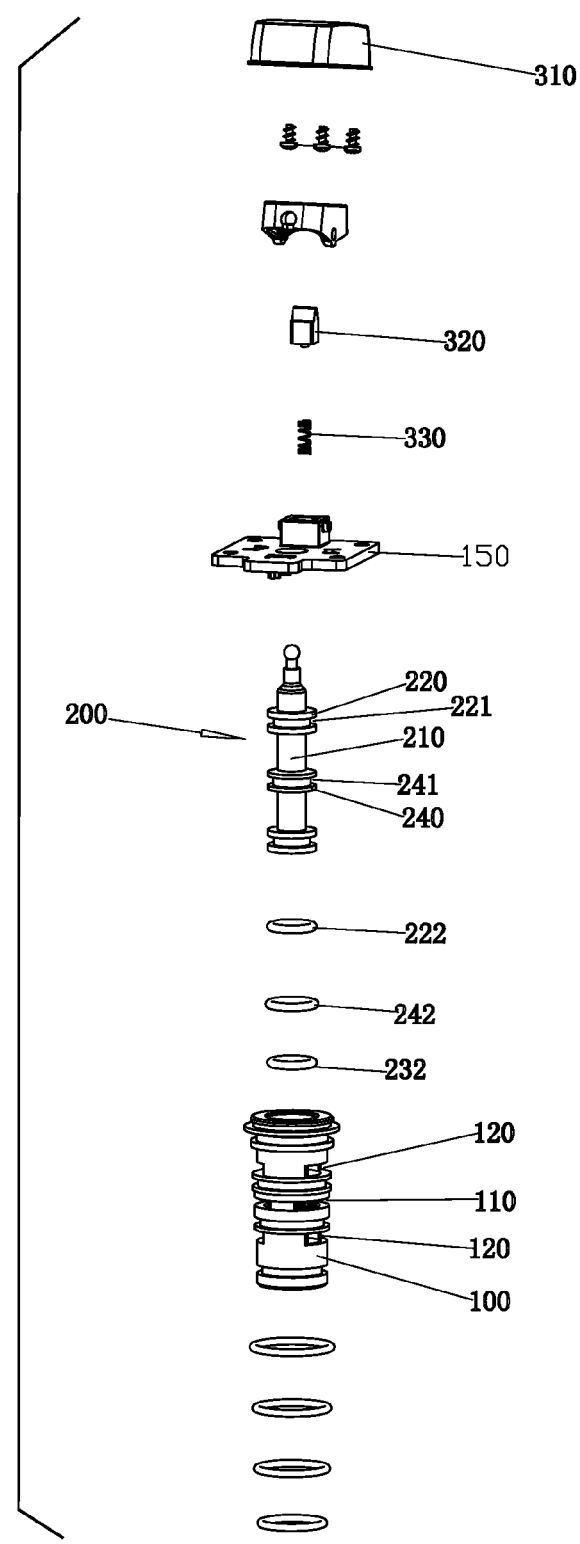
FIG. 8 illustrates an exploded and schematic diagram of the third embodiment of the present invention.
Figure 9:
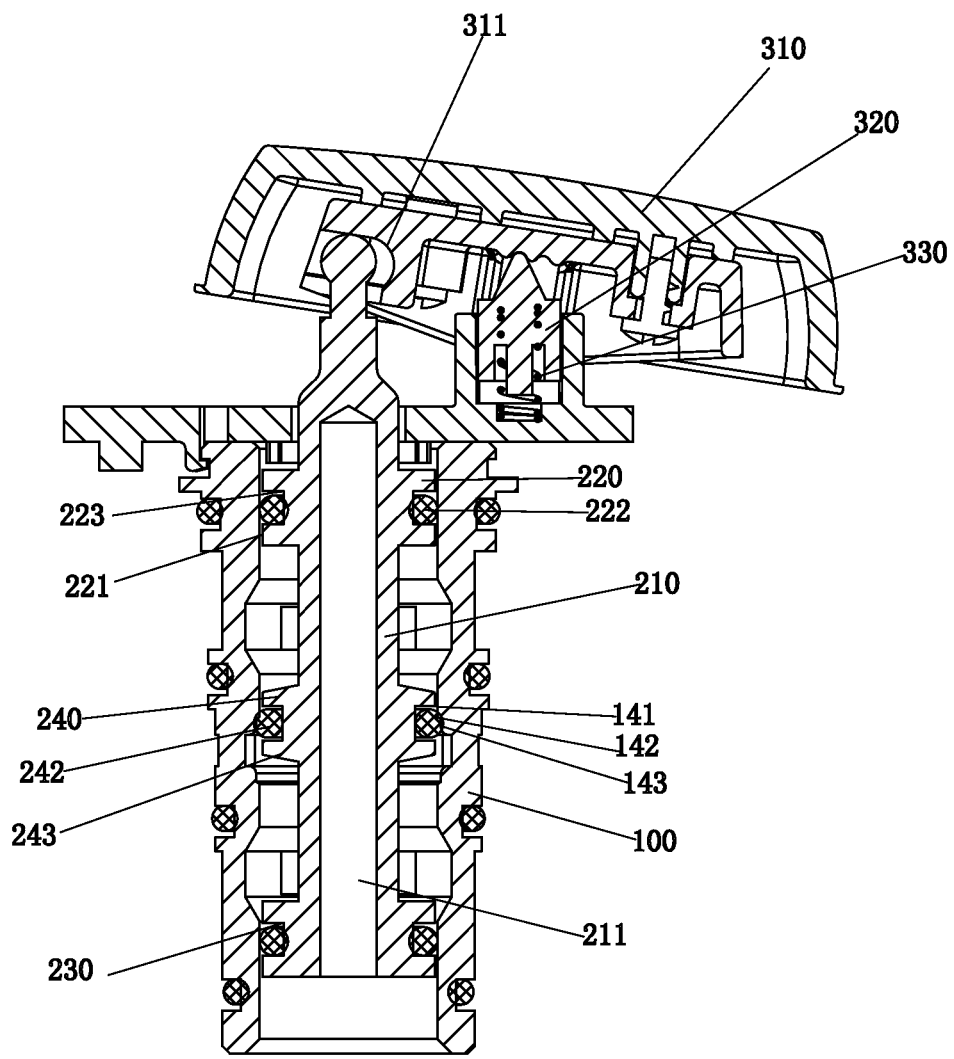
FIG. 9 illustrates a sectional diagram of the third embodiment.

The second embodiment: as figured in FIGS. 4~6, they illustrate the second embodiment of the present invention; therein, FIG. 4 is the sectional diagram of the switch chamber 10 disposed in the valve body 40; FIG. 5 is the sectional diagram of the spindle 20; FIG. 6 is the sectional diagram of this embodiment assembled to a housing 1.

As figured in FIG. 4, the switch chamber 10 of this embodiment has similar shape and structure with the first embodiment, here is no further description. The switch chamber 10 is disposed in a columnar valve body 40; the outer wall of the valve body 40 is disposed with three flowing holes 41, 43, 42 in the axial direction, they are respectively corresponding to the inlet and two outlets, they have the same function.

As figured in FIG. 5, it is the sectional diagram of the spindle 20, the piston 21, 23 of the spindle and the flowing section 22 have the similar shape with the spindle 20 of the first embodiment, the difference is that, the spindle 20 of FIG. 5 has an axial through hole 28, the through hole 28 is used to connect two slide sections of the switch chamber 10 of FIG. 4.

As figured in FIG. 6, when the spindle 20 couples to the switch chamber 10, the whole valve body 40 is assembled in a housing 1, the housing 1 has three axial cavities 5, 6, 7 and a columnar blind hole 8 running through the three cavities; each cavity has an extending waterway; the cavity 5 has a waterway 2, the cavity 6 has a waterway 3, the cavity 7 has a waterway 4, the waterways 2, 3, 4 are respectively connected to the pipes at the outer side of the housing 1.

The valve body 40 is coupled to the inner side of the blind hole, the cavities 5, 6, 7 are respectively connected to the flowing holes 41, 42, 43 to form an independent waterway.

As can be seen from above, the valve body 40 is coupled to the housing 1, so that the switch chamber 10 and the spindle 20 can form an independent component that can couple to a housing 1 made of various materials with various waterways. If only the waterways 2, 3, 4 can be connected to the flowing holes 41, 42, 43 and relatively independent, it can form an integrate switch valve. The valve body 40 and the spindle 20 can be made to modules that it is benefit to scale production and application. Moreover, the valve body 40 reflects a feature of the switch chamber 10: the periphery positions of the flowing holes 41, 42, 43 are not limited, they can be interacted and arranged in 360° so as to be available in the housing 1 with different waterways, therefore, the switch valve has well applicability in different housings.

The outer wall of the valve body 40 is disposed with sealing rings by the grooves 44, 45, 46, 47, the sealing rings make the cavities 5, 6, 7 relatively separated and sealed, so that it is easy to assemble and form the waterways. The spindle 20 is disposed with the axial through hole 28 to connect the two slide sections of the switch chamber 10 of FIG. 4, combining FIG. 6, when the spindle 20 moves up and down in the valve body 40, the through hole 28 connects the slide sections at two ends of the switch chamber 10 of FIG. 4, so that the air pressure below and above the blind hole 8 are balanced, so as to solve the problem that the spindle 20 may move unsmoothly due to the air pressure, so that the spindle 20 moves up and down smoothly with less resistance. In the actual situation, the through hole 28 can be connected to the outer end of the spindle 20 to connect to the outer air of the valve body 40, thus further balancing the air pressure at the inner side to decrease the pressing resistance.

Considering the seesaw pressing hand feel of the lever 30, the lever 30 is disposed with a gear block 31; a pin with a reset spring is further configured, it couples to the gear block 32 when the lever 30 moves up and down, making it with gearing hand feel, and it also assists to the inclined positioning of the lever 30, thus improving the stably of the spindle 20.

The third embodiment: as figured in FIGS. 7~13, they illustrate the third embodiment of the present invention. The lever type switch valve comprises a valve body 100 and a spindle 200.

The valve body 100 is disposed with an inlet 110, two outlets 120 and a switch chamber, the switch chamber is divided into three sections in the axial direction: two outlet cavities 130 at the two ends and an inlet cavity 140 at the central section, the inlet 110 is connected to the inlet cavity 140, two outlets 120 are respectively connected to the two outlet cavities 130, the outlet cavities 130 respectively have a slide section 131 at the axial outer end, the inlet cavity 140 has two sealing sections below and above the inlet 110. In this embodiment, the top portion of the valve body 100 is disposed with a cover plate 150.

In this embodiment, the sealing section has a first straight section 141, a transition incline section 142 and a second straight section 143 connected in sequence, the diameter of the second straight section 143 is larger than the diameter of the first straight section 141 and the second straight section 143 is near to the inlet 110, it has well sealing performance.

In this embodiment, the connecting portion of the inner end of the outlet 120 and the slide section 131 is disposed with a first guiding incline surface 121, the connecting portion of the inner end of the outlet 120 and the first straight section 141 is disposed with a second guiding incline surface 122, so that the sealing rings are protected during assembling, thus avoiding damage to the sealing ring by the sharp portion of the outlet during assembly resulting in being unable to seal In this embodiment, the slide section 131 is straight column shaped, so that it is force saving at the beginning of moving and during the sliding.

The spindle 200 is slidably assembled in the switch chamber in the axial direction, it has a spindle body 210, two first sealing plugs 220, 230 respectively coupled to the two slide sections 131 in sealing way and a second sealing plug 240 that can switch to couple to the two sealing sections, three sealing plugs are axially spaced arranged in the spindle body 210 and the second sealing plug 240 is disposed between the two first sealing plugs 220, 230; when the second sealing plug 240 coupled to one sealing section in sealing way, the inlet 110 is connected to the outlet 120 of the other side of the sealing section.

In this embodiment, the second sealing plug 240 is a piston, it can couple to the transition incline section 142 and the second straight section 143 in sealing way In this embodiment, the spindle 210 is disposed with an axially extending through hole 211, the through hole 211 is connected to the bottom portion of the switch chamber. The spindle body is disposed with the axially extending through hole, thus making the spindle light and switched force saving, at the same time, the through hole is an obligate exhaust hole, if it needs to exhaust the air at the bottom portion of the switch chamber, it only needs to dispose a throughout hole in the spindle body to connect to the through hole to exhaust the air, thus making it with well suitability.

In this embodiment, the first sealing plug 220 comprises a first protruding ring 221 and a first sealing ring 222, the first protruding ring 221 is fixedly connected to the spindle body 210 and it is concaved with an annular first groove 223 at the outer periphery, the first sealing ring 222 is locked to the first groove 223, the first sealing ring 222 is slidably coupled to the slide section 131 in sealing way; in this embodiment, the structure of the first sealing plug 230 is similar to the first sealing plug 220.

The second sealing plug 240 comprises a second protruding ring 243 and a second sealing ring 242, the second protruding ring 243 is fixedly connected to the spindle body 210, and it is concaved with an annular second groove 241 at the outer periphery, the second sealing ring 242 is locked to the second groove 241; the second protruding ring 243 of the second seating ring 242 has the upper end face inclined upwardly and the lower end face inclined downwardly, the periphery wall thereof is straight column shaped; the second sealing plug 240 can couple to the transition incline section 142 and the second straight section 143 of the sealing section in sealing way.

In this embodiment, the switch valve further comprise a lever button 310 with gears, a position pin 320 fixed to the cover plate 150 and coupled to the gears and a reset elastic element 330, the lever button 310 is disposed with a movable portion 311, the top end of the spindle body 210 is movably coupled to the movable portion 311 to drive the spindle 200 to slide in the axial direction, the reset elastic element 330 abuts between the cover plate 150 and the position pin 320. when the lever button 310 moves up and down like a seesaw, it drives the spindle 200 to move up and down in the axial direction. in this embodiment, the switch valve further comprises a housing 400, which is disposed with an assembly chamber 410, an inlet passage 420 and two outlet passages 430, the inlet passage 420 is disposed between the two outlet passages 430, the valve body 100 is assembled to in the assembly chamber 410, the inlet 110 is connected to the inlet passage 420, two outlets 120 are respectively connected to the two outlet passages 430.

In this embodiment, the switch valve is further disposed with a sealing ring 440, which abuts between the outer wall of the valve body 100 and the cavity wall of the assembly cavity 410.

Figure 12:
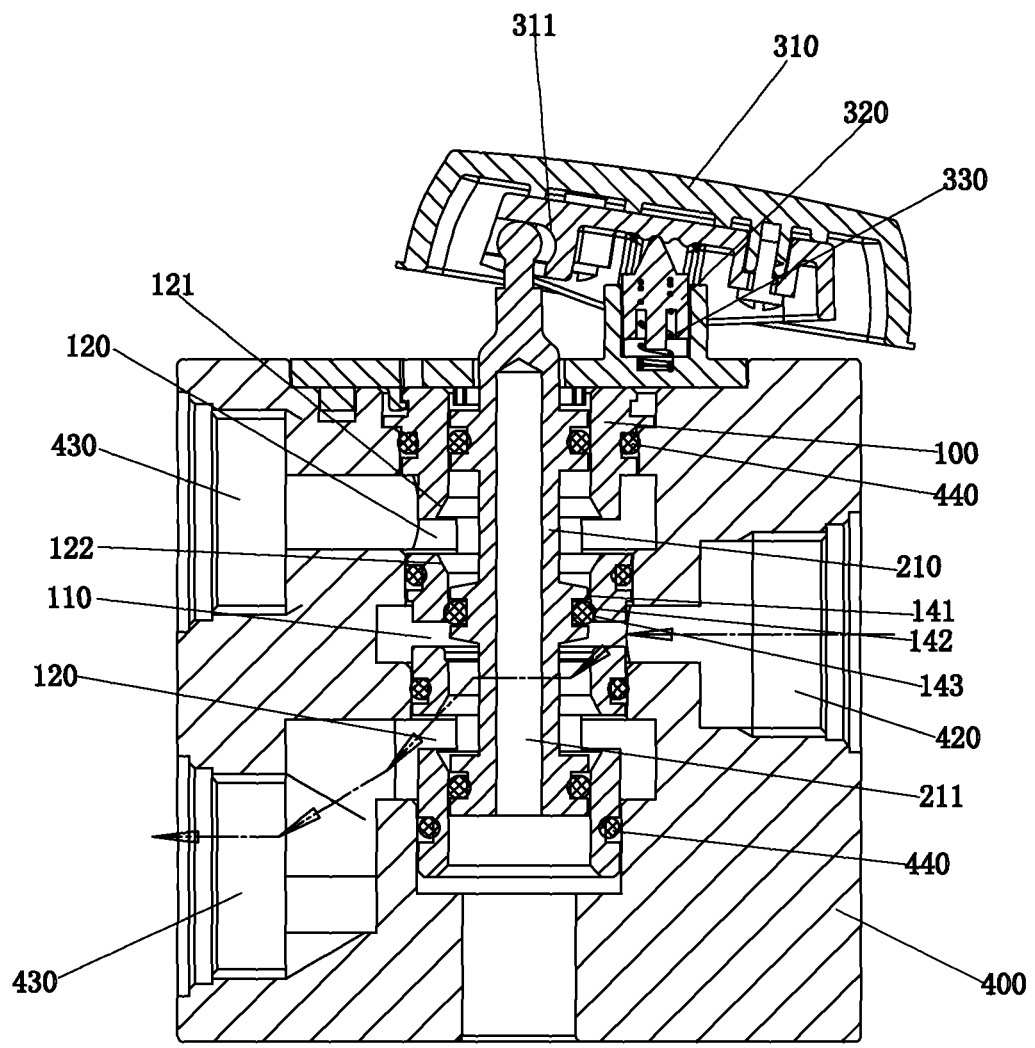
FIG. 12 illustrates a sectional diagram of the lever type switch valve with a housing of the third embodiment when the inlet passage is connected to the lower outlet passage.
Figure 13:
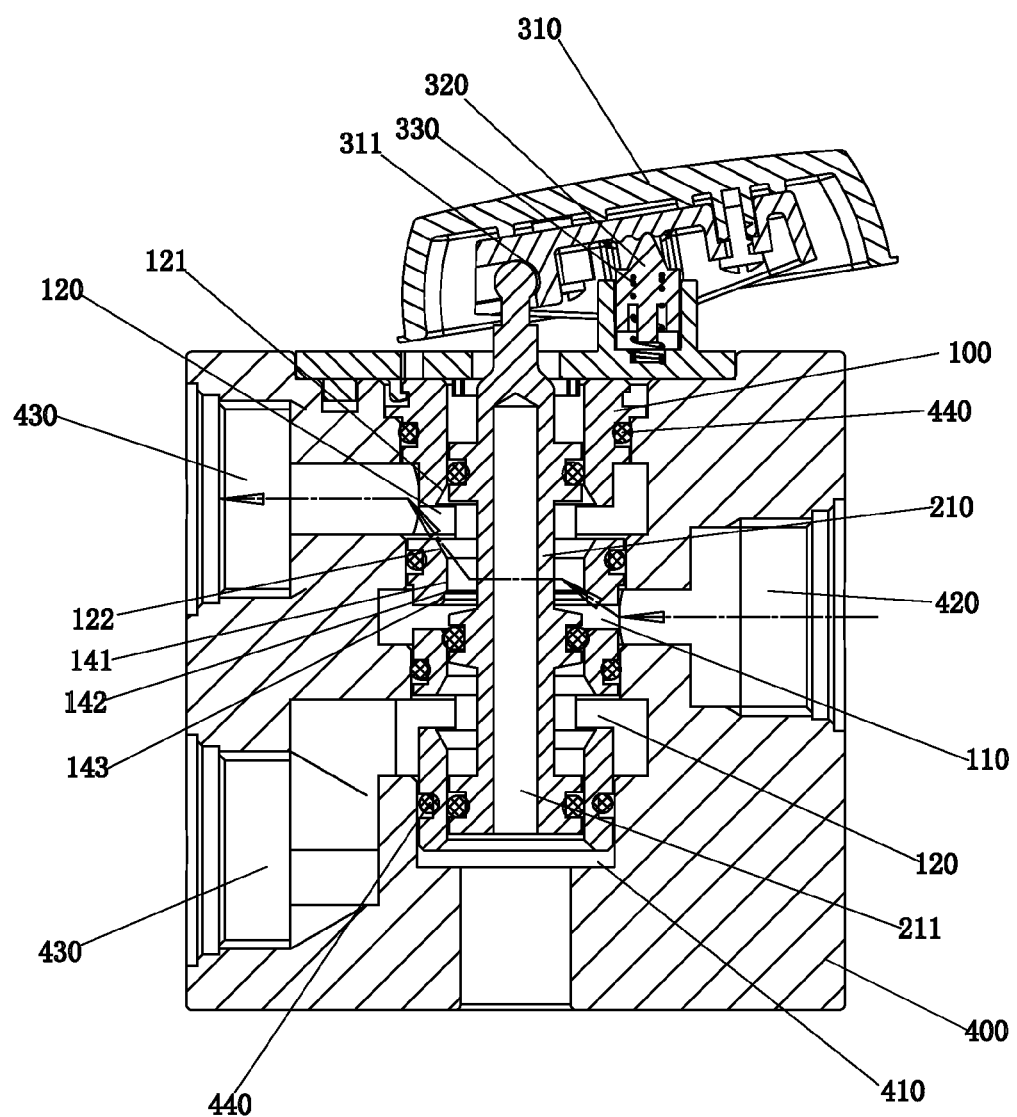
FIG. 13 illustrates a sectional diagram of the lever type switch valve with a housing of the third embodiment when the inlet passage is connected to the upper outlet passage.

The working principle thereof is that:

In the initial state, if the second sealing plug 240 of the spindle 200 is coupled to the sealing section above the inlet 110 in sealing way to disconnect the outlet above 120 and the inlet 110, the outlet 120 below the inlet is connected to the inlet 110, the outlet 120 outflows water, as figured in FIG. 12;

Pressing the lever button 310 to drive the spindle to slide downwardly to make the second sealing plug of the spindle coupled to the sealing section below the inlet in sealing way to connect the outlet 120 and the inlet 110, the outlet above the inlet 110 is connected to the inlet 110, the outlet 120 outflows water, as figured in FIG. 13.

As the second sealing plug is switched to close the two sealing sections, it has short route and it meets the large outlet volume need, the spindle can remove the water resistance of the spindle, at the same time, it gets a motive force in the same direction, thus making the switch force saving and the switch forces at the upper waterway and the lower waterway balanced, it also assists to the sealing effect of the sealing section.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a lever type switch valve that with the lever device, it drives the spindle assembled in the switch chamber to move up and down, the piston of the spindle turns on or cuts off the waterway, thus achieving the switch of the waterway. The lever type switch function of the present invention is switch force saving, switch force balanced and the spindle route shortened with well industrial applicability.

What is claimed is:

1. A lever type switch valve, comprising:
    a switch chamber having three sections arranged in an axial direction defining two outlet cavities at two ends and an inlet cavity in a central section an outer end of each outlet cavity in the axial direction having a slide section, and inner protruding rings respectively disposed between two ends of the inlet cavity and the outlet cavities;
    a spindle having a dumbbell shape, the spindle slidably coupled to an inner side of the switch chamber so as to slide axially within the switch chamber, the spindle having three sections in the axial direction, including two pistons at two ends and a flowing section in a central section, each of the two pistons having a large outer end and a small inner end; and
    a lever, moveably coupled to one end of the spindle by a moveable element, such that a movement of the lever moves the spindle in the axial direction,
    wherein, the large outer ends of the pistons are slidably coupled to the slide section so as to form a seal with the slide section,
    an axial length of the outlet cavity is larger than an axial length of each piston,
    an axial length of the flowing section is larger than an axial length of the inlet cavity,
    the flowing section passes through the inner protruding rings and has two flowing passages with the inner protruding rings, respectively, the inlet cavity being connected to an inlet,
    the outlet cavities are respectively connected to an outlet,
    when the inner end of the piston of one outlet cavity couples to one of the inner protruding rings on the corresponding side so as to form a seal with the one of the inner protruding rings, a waterway of the outlet cavity and the inlet cavity is closed, and at the same time, the other outlet cavity is connected to the inlet cavity via a waterway between the flowing section and the inner protruding ring, and
    wherein the lever includes a gear block and a pin with a reset spring, such that the reset spring exerts force against the pin in the axial direction to push the pin against the gear block, such that the pin movably couples to the gear block when the lever moves up and down.

2. The lever type switch valve according to claim 1, further comprising:
    a housing; and
    a columnar valve body in which the three sections are formed, the columnar valve body housed in the housing,
    wherein the switch chamber is disposed in the columnar valve body,
    an outer wall of the columnar valve body is axially disposed with three holes that respectively correspond to the inlet and the two outlets,
    the housing includes three inlet and outlet cavities arranged axially and a columnar blind hole running through the three inlet and outlet cavities,
    each cavity has an extension waterway,
    the valve body is coupled to the inner side of the blind hole, and
    each cavity connected to a hole to form an integrated waterway.

3. The lever type switch valve according to claim 2, wherein the outer wall of the valve body is disposed with two sealing rings between the three cavities to seal and block waterways between the three inlet and outlet cavities.

4. The lever type switch valve according to claim 1, wherein one of the slide sections of the outlet cavity keeps in sealing state with the corresponding piston, and the spindle is disposed with a through hole in the axial direction, the through hole connecting the two slide sections.

5. The lever type switch valve according to claim 1, wherein the flowing section is a connecting rod, a diameter of the connecting rod is smaller than an inner diameter of the inner protruding ring.

6. The lever type switch valve according to claim 1, wherein the inner end and the outer end of each piston is respectively disposed with a groove, which is embedded with a sealing ring,
    the sealing ring of the outer end is slidably coupled to an inner wall of the slide section in sealing way, and
    the sealing ring of the inner end of pistons are coupled to the inner protruding rings in sealing way, respectively.

7. A lever type switch valve, comprising: a valve body with an inlet, two outlets and a switch chamber, the switch chamber having three sections in an axial direction that define two outlet cavities at two ends and an inlet cavity in a central section, the inlet connected to the inlet cavity, two outlets respectively connected to the two outlet cavities, an outer end of each outlet cavity in the axial direction is disposed with a slide section, each slide section having a straight column shape, the inlet cavity disposed with two sealing sections respectively located above and below the inlet; a spindle slidably assembled in the switch chamber axially, the spindle having a spindle body, two first sealing plugs respectively slidably coupled to the two slide sections in a sealing way and a second sealing plug that is movably coupled to the two sealing sections, the three first and second sealing plugs being spaced apart in the axial direction in the spindle body such that the second sealing plug is located between the two first sealing plugs, such that when the second sealing plug is coupled to one of the sealing sections of the valve body, the inlet is connected to the outlet located on the other side of the sealing section to which the second sealing plug is coupled; a cover plate disposed on a top portion of the valve body; and a lever button with gears, a position pin fixed to the cover plate and coupled to the gears, and a reset elastic element, the lever button having a movable portion, a top end of the spindle body being movably coupled to the movable portion to drive the spindle to slide axially, wherein the reset elastic element abuts between the cover plate and the position pin, and wherein the reset elastic element exerts a force in the axial direction against the cover plate and the position pin.

8. The lever type switch valve according to claim 7, wherein each sealing section has a first straight section, a transition incline section and a second straight section that are connected in sequence,
- a diameter of the second straight section is larger than a diameter of the first straight section,
- the second straight section is closer to the inlet than the first straight section,
- the second sealing plug is a piston, and
- the second sealing plug is coupled to the transition incline section and the second straight section to form a seal with the second straight section.

9. The lever type switch valve according to claim 8, wherein a first guiding incline surface is respectively disposed at a connecting position of an inner end of one of the outlets and one of the slide sections, and a second guiding incline surface is disposed at a connecting position of another inner end of the one of the outlets and the first straight section.

10. The lever type switch valve according to claim 7, wherein each of the first sealing plugs comprises a first protruding ring and a first sealing ring,
in each first sealing plug, the first protruding ring is fixedly connected to the spindle body and an annular first groove is concaved at the outer periphery of the first protruding ring,
the first sealing ring is locked to the first groove,
the first sealing ring is slidably coupled to one of the slide sections to form a seal with the slide section,
the second sealing plug comprises a second protruding ring and a second sealing ring, the second protruding ring being fixedly connected to the spindle body and an annular second groove formed inward at the outer periphery of the second protruding ring,
the second sealing ring is locked to the second groove, and
the second sealing ring is coupled to one of the sealing sections to form a seal with the sealing section.

11. The lever type switch valve according to claim 10, wherein the second protruding ring of the second sealing ring has an upper end face inclined upwardly and a lower end face inclined downwardly,
- a periphery wall of the second protruding ring has a straight tubular shape, and
- the second sealing plug is movably coupled to a transition incline section and a second straight section of the sealing sections to form a seal with the sealing section.

12. The lever type switch valve according to claim 7, further comprising a housing,
- wherein the housing has an assembly cavity, an inlet passage and two outlet passages,
- the inlet passage is located between the two outlet passages,
- the valve body is located in the assembly cavity,
- the inlet is connected to the inlet passage, and
- the two outlets are respectively connected to the two outlet passages.

13. The lever type switch valve according to claim 12, further comprising a sealing ring which abuts between an outer wall of the valve body and a wall of the assembly cavity.

14. The lever type switch valve according to claim 7, wherein the spindle body is disposed with a through hole extended axially, and
the through hole is connected to a bottom portion of the switch chamber.

* * * * *